United States Patent [19]

Noda et al.

[11] 4,005,422
[45] Jan. 25, 1977

[54] RADAR WITH SAMPLING GATE CIRCUIT FOR VIDEO SIGNAL

[75] Inventors: Hiroshi Noda; Yukiyasu Watanabe, both of Kyoto, Japan

[73] Assignee: Mitsubishi Denki Kabushiki Kaisha, Tokyo, Japan

[22] Filed: Feb. 12, 1975

[21] Appl. No.: 549,490

[30] Foreign Application Priority Data

Mar. 2, 1974 Japan ............................ 49-24947

[52] U.S. Cl. ......................................... 343/17.1 R
[51] Int. Cl.² ......................................... G01S 7/28
[58] Field of Search ............................. 343/17.1 R

[56] References Cited

UNITED STATES PATENTS

| | | | |
|---|---|---|---|
| 3,281,841 | 10/1966 | Forestier | 343/17.1 R |
| 3,423,754 | 1/1969 | Gonn | 343/17.1 R |
| 3,454,946 | 7/1969 | Warren et al. | 343/17.1 R |
| 3,706,991 | 12/1972 | Gillmer | 343/17.1 R X |
| 3,731,310 | 5/1973 | Rittenbach | 343/17.1 R |
| 3,768,096 | 10/1973 | Dentino | 343/17.1 R X |
| 3,772,697 | 11/1973 | Ross | 343/17.1 R X |

Primary Examiner—T.H. Tubbesing
Assistant Examiner—Richard E. Berger
Attorney, Agent, or Firm—Oblon, Fisher, Spivak, McClelland & Maier

[57] ABSTRACT

A radar is provided which has an antenna for transmitting and receiving waves and a transmitting and receiving device for transmitting a signal from the antenna corresponding to reference pulses of a reference pulse generator and receiving with the antenna the reflected signal from a target to generate an intermediate frequency signal. A gate pulse generator under the control of the reference pulses generates gate pulses which determine the sampling position of the intermediate frequency signal. A sampling gate circuit detects a video signal by sampling the intermediate frequency signal from the transmitting and receiving device in accordance with the gate pulses. A display displays the video signal.

4 Claims, 8 Drawing Figures

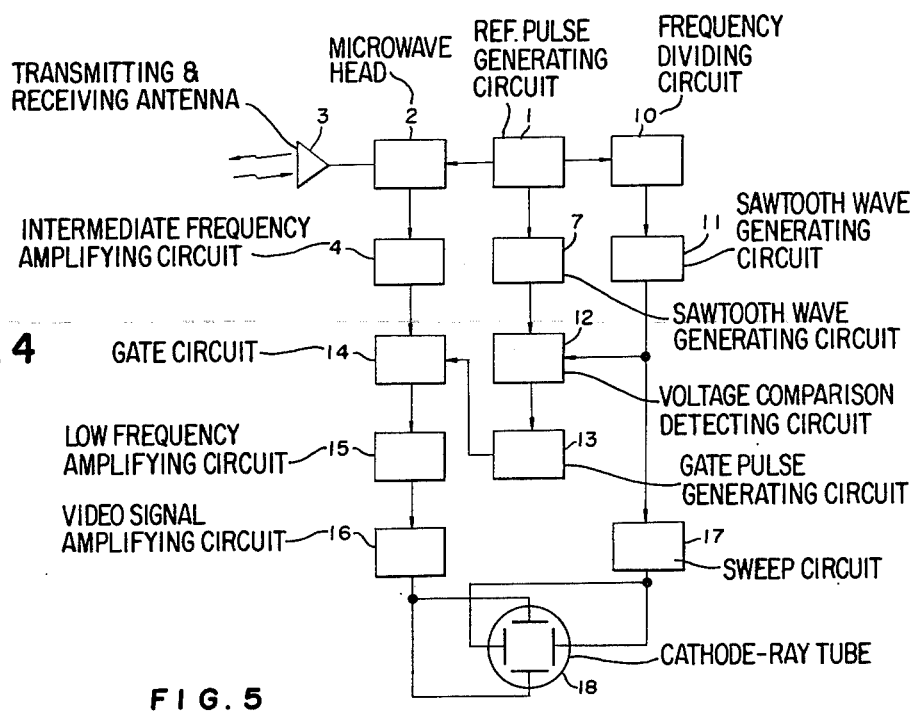
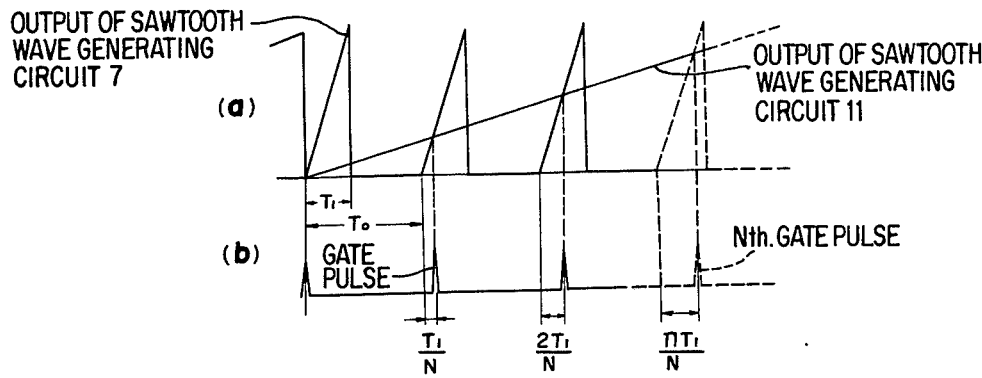
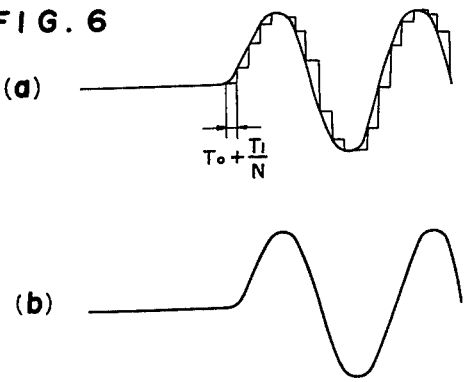

RADAR WITH SAMPLING GATE CIRCUIT FOR VIDEO SIGNAL

BACKGROUND OF THE INVENTION

1. Field of the Invention

The present invention relates to a radar having a sampling gate circuit for a video signal.

2. Description of the Prior Art

It has been known to use a pulse radar for detecting the distance to a target from the time difference between a transmission wave and a received wave by transmitting a pulse wave under constant periodic motion and receiving the reflected wave from the target.

One embodiment of the conventional radar will be illustrated by referring to FIG. 1. In FIG. 1, a reference pulse oscillating circuit 1 generates a reference pulse under constant periodic motion to feed it to a microwave head 2 and a saw tooth wave generator 7. The microwave head 2 is triggered by the reference pulse to generate a pulse microwave shown in FIG. 2a to radiate through an antenna 3 to space. The microwave is reflected by the target to return to the antenna 3 so as to be received as shown in FIG. 2b. The frequency conversion of the microwave is performed by the microwave head 2 to transmit an intermediate frequency signal to an intermediate frequency amplifying circuit 4. The signal amplified in the intermediate frequency amplifying circuit is detected by a detecting circuit 5 to give the signal shown in FIG. 2c. The detected output is amplified by a video signal amplifying circuit 6 and is then fed to a cathode-ray tube 9.

The saw tooth wave generating circuit 7 is triggered by reference pulse oscillating circuit 1 to generate the saw tooth wave of FIG. 2d. The saw tooth wave is voltage-amplified or current-amplified by sweep circuit 8 and is then utilized to operate cathode-ray tube 9.

When the detecting signal of FIG. 2c is a signal for vertical deflection and the saw tooth wave signal of FIG. 2d is a signal for horizontal deflection, the signal intensity in the vertical direction and the time in the horizontal direction is shown on the picture plate of the cathode-ray tube as shown in FIG. 3.

The distance to the target can be given from the equation $$L = Ct_1/2 \ [m] \qquad (1)$$

wherein C designates the velocity of the wave in the horizontal time base, [m/sec]; L designates a distance to the target [m] and $t_1$ designates the difference between the transmission wave and the received wave [sec].

However, in the conventional radar, the output given by detecting the intermediate frequency signal is displayed on the picture plate of the cathode-ray tube 9. Accordingly, in order to accurately amplify the pulse signal waveform of the reflected wave, the following frequency band width B is required as a characteristic of the video signal amplifying circuit 6.

$$B = 1.2/t_o \sim 1.5 t_o \ [1/\text{sec.}] \qquad (2)$$

wherein $t_o$ designates the transmission pulse width of the microwave [sec.] The transmission pulse width $t_o$ in the case of a near detecting distance of 50 [m] ~ 2 [Km] should be less than 0.1 [μs] when the distance resolution is less than 15 m.

Accordingly, a broad band width from low frequency to about 15 [MHz] is required for the video signal amplifying circuit 6 from the equation:

$$B = 1.5/0.1 \times 10^{-6} \ [1/\text{sec.}] \qquad (3).$$

For the cathode-ray tube 9, a similar band width is required for displaying the pulse waveform. Accordingly, a cathode-ray tube having a quick frequency response and a broad band is required. Moreover, the video signal amplifying circuit and the cathode-ray tube have broad bands whereby the pulse noise shown in FIG. 2 is also easily amplified. The noise is also displayed on the picture plate of the cathode-ray tube 9 as shown in FIG. 3 so as to cause erroneous measurement.

SUMMARY OF THE INVENTION

The foregoing and other objects are attained in accordance with one aspect of the present invention through the following provisions.

In a radar having a sampling gate circuit for a video signal, the reflected wave from a target is received by an antenna. The received signal is converted to an intermediate frequency signal by a transmitting and receiving device. A gate pulse for deciding positions for sampling the intermediate frequency signals is generated by a pulse generator. The intermediate frequency signal is sampled depending upon the gate pulses. The sampled output is displayed as a video signal on a display.

The transmitting and receiving device for providing the intermediate frequency signal comprises a transmitting part for radiating a transmission wave to the target and a mixer part which receives the reflected wave from the target and frequency-mixes the received signal and the local oscillation signal of the local oscillating part.

The sampling detection cannot be performed without synchronizing the transmission wave of the transmitting part with the local oscillation signal of the local oscillating part. A synchronous relation can be given between the transmission wave of the transmitting part and the local oscillation signal of the local oscillating part by forming the transmitting part and the local oscillating part of the transmitting and receiving device with a gunn diode for oscillation and a selectively operated varactor diode in the cavity resonator.

The pulse generator for generating a gate pulse determines the positions for sampling the intermediate frequency signal. Two types of pulse generators are considered.

One pulse generator is an analogue processed one comprising a first saw tooth wave generator for generating a first saw tooth wave under a trigger from the reference pulse generator for generating trigger pulses for radiating the transmission wave; a second saw tooth wave generator for generating a second saw tooth wave under the trigger by the output resulting from frequency-dividing the reference pulses; and a voltage comparator which generates an output signal when the first and second saw tooth wave voltages become equal.

The other pulse generator is a digital processed one comprising a first counter for counting the reference pulse number; a second counter for counting the pulse number of the pulses given by frequency-dividing the reference pulses by sampling times; a count comparator which generates an output signal when the counted numbers of the first and second counters become equal; and a resetting device for resetting the first and second counters when the counted number of the first counter reaches the sampling number.

A gate pulse generator for generating gate pulses by the voltage or the output signal of the count comparator is connected thereto. The sampling detection is performed by a gate circuit for video signals by sampling the intermediate frequency signal by the gate pulses of the pulse generator whereby the amplifier and the display which has a low frequency band can be used for generating video signals for desirable information similar to the information of conventional radar. The high frequency component of the pulse noise is removed so as to decrease erroneous measurement of the pulse noise.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings in which:

FIG. 4 is a block diagram of one embodiment of the present invention;

FIG. 5 shows the first and second saw tooth waveforms for determining the position of sampling and the gate pulse waveform for sampling according to the invention; and FIG. 6 shows a waveform for illustrating the working of sampling detection according to the invention.

DETAILED DESCRIPTION OF THE PREFERRED EMBODIMENTS

Figure 1:
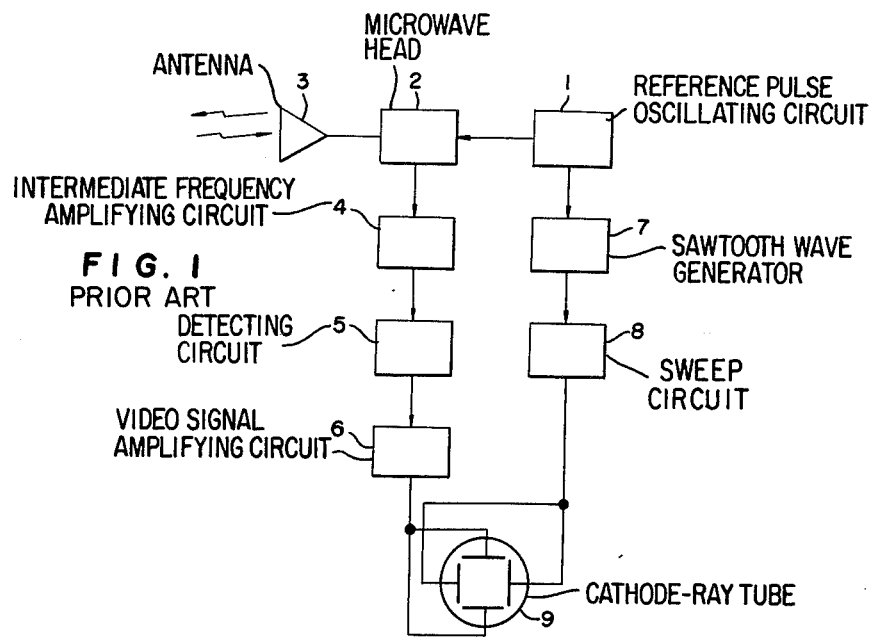
FIG. 1 is a block diagram of the conventional radar.
Figure 2:
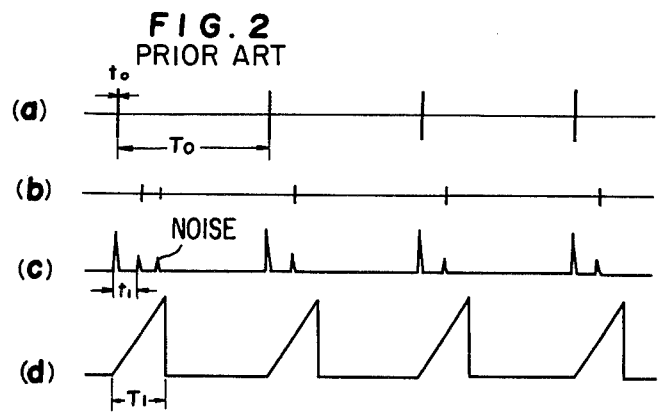
FIG. 2 shows working waveforms of the conventional radar wherein *a* shows a waveform of the transmission pulse; *b* shows a received waveform of the reflected wave from the target; *c* shows a waveform of the video signal which is detected; and *d* shows a saw tooth waveform for horizontal deflection of the cathode-ray tube.
Figure 3:
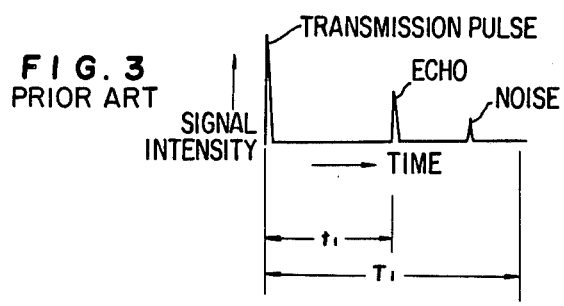
FIG. 3 is a waveform observed on the picture plate of the cathode-ray tube using a conventional radar.

Referring now to the drawings, wherein like reference numerals designate identical or corresponding parts throughout the several views, and more particularly to FIG. 4 thereof, one embodiment of the radar of the invention will be described. In FIG. 4, the microwave head 2 is triggered depending upon the reference pulses of the reference pulse generating circuit 1 and generates pulse microwaves. The output is radiated from a transmitting and receiving antenna 3. The radiated microwave is reflected by the target. The reflected wave is received by the transmitting and receiving antenna 3. The frequency conversion is performed by the microwave head 2 which generates an intermediate frequency signal. The intermediate frequency signal is amplified by the intermediate frequency amplifying circuit 4 and is input to the gate circuit 14. The reference pulse of the reference pulse generating circuit 1 triggers the saw tooth waveform generating circuit 7 to generate a first saw tooth wave which is input to the voltage comparison detecting circuit 12.

The reference pulses of the reference pulse generating circuit 1 are frequency divided to 1/N by the frequency dividing circuit 10. The frequency divided output pulses trigger the saw tooth wave generating circuit 11 to generate a second saw tooth wave. The second saw tooth wave is input to the voltage comparison detecting circuit 12 and is also input to the sweep circuit 17 for operating the cathode-ray tube 18.

The two input waveforms to the voltage comparison detecting circuit 12 are the first and second saw tooth waves shown in FIG. 5a. The voltage comparison detecting circuit 12 generates an output when the voltage difference between the first saw tooth wave voltage of the saw tooth wave generating circuit 7 and the second saw tooth wave voltage of the saw tooth wave generating circuit 11 is changed from negative to positive whereby the gate pulse generating circuit 13 generates gate pulses at its output. The gate pulses are input to the gate circuit 14 whereby the intermediate frequency signal is sampled depending upon the gate pulses input to the gate circuit 14.

The gate pulse waveform of the gate pulse generating circuit 13 is shown in FIG. 5b wherein the quadrature axis is a time base. The width of the gate pulse is quite narrow and is about 10 n sec. When the width of the first saw tooth wave of the saw tooth wave generating circuit 7 is $T_1$ [sec.]; the repeated period of the first saw tooth wave is $T_o$ [sec.], the reference pulses are frequency-divided to 1/N by the frequency dividing circuit 10 and the gate pulses of the gate pulse generating circuit 13 are sequentially shifted to $T_1/N$ [sec.] per each generation of gate pulses of the gate pulse generating circuit 13 from the reference point (which is the rising point of the second saw tooth wave of the saw tooth wave generating circuit 11). Accordingly, the nth gate pulse is generated after $n \cdot T_1/N$ [sec.] from the reference point. At the final, when the N gate pulses are generated, the reset circuit is actuated to return to the next reference point and the operation is repeated.

The gate circuit 14 is controlled by the gate pulses generated by the gate pulse generating circuit 13. The intermediate frequency signal is passed only when the gate pulse is applied. The voltage is maintained until the next gate pulse is applied. That is, the sampling of the intermediate frequency signal is performed at each point shifting for $T_1/N$, sequentially, and the voltage at each moment is sequentially maintained to complete the sampling by the N gate pulses.

As a result, the output of the gate circuit 14 is given as a step waveform having a width of $T_o + T_1/N$ as shown in FIG. 6a. The output of the step waveform of the gate circuit 14 is passed through the waveform shaping circuit and only the low frequency component is amplified by the low frequency amplifying circuit 15 to give the output having a smooth waveform shown in FIG. 6b. The output signal is amplified by the video signal amplifying circuit 16 and is fed to the cathode-ray tube 18.

Figure 7:
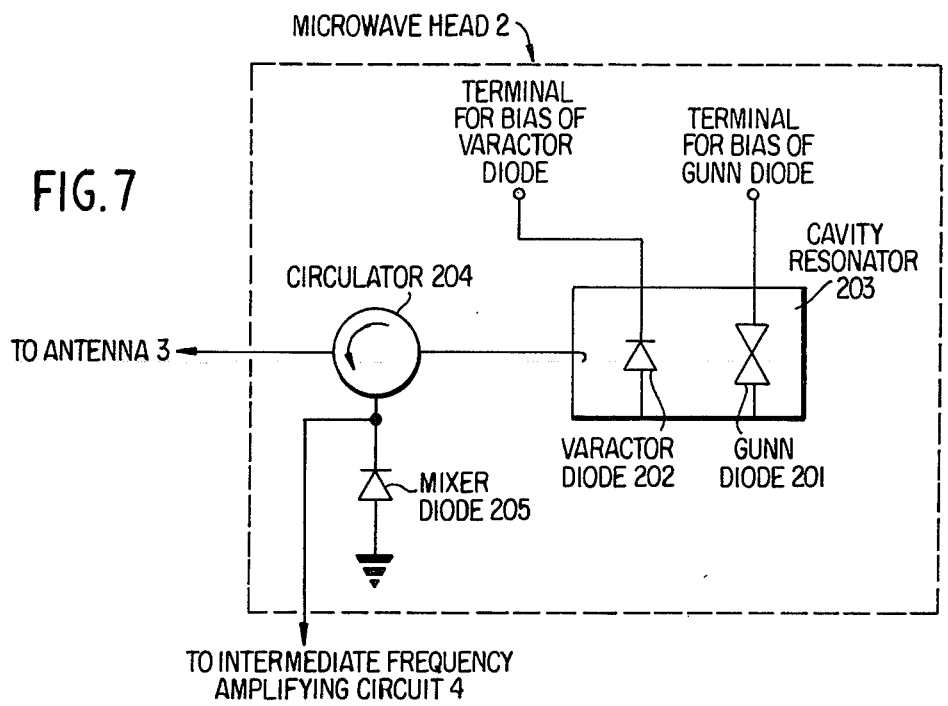
FIG. 7 shows in greater detail the microwave head 2 of FIG. 4.

The output of the sweep circuit 17 for operating the cathode-ray tube 18 is fed to the deflecting part of the cathode-ray tube 18 to display an echo from the target on the picture plate of the cathode-ray tube 18. The microwave head 2 as shown in FIG. 7 has a gunn diode 201 for oscillation and a varactor diode 202 for converting the frequency in the cavity resonator 203, and has a structure comprising an alumina substrate equipped with a circulator 204 and a mixer diode 205.

The gunn diode continuously oscillates by applying a constant DC bias voltage (about ten volts) to the cavity resonator. The oscillation frequency $f_o$ is about 10 GHz. The purpose of the varactor diode in the cavity oscillator is to change the resonance frequency of the cavity resonator by receiving the output pulse voltage ($-3 \sim -12$ volts) from the reference pulse oscillating circuit 1 whereby the oscillation frequency $f_o$ of the gunn diode is deflected for 30 MHz. The deflected frequency is designated as $f_1$. The signal having the frequency $f_1$ is passed through the circulator to be radiated from the antenna 3.

The reflected wave is received by the antenna 3 with a time difference depending upon the distance to the target, and is fed to the mixer diode. At this time, the gunn diode is oscillated at the oscillation frequency $f_o$, and the signal is passed through the circulator and is radiated from the antenna 3 with a part thereof being fed to the mixer diode.

The intermediate frequency signal is generated by the reflected wave from the target which is input to the mixer diode and the oscillation frequency $f_o$ of the gunn diode. The intermediate frequency signal is fed to the intermediate frequency amplifying circuit 4 which has a central frequency $f_{if}$ of 30 MHz and should have a pass band width of $\pm 15$ MHz because of the distance resolution of the radar of less than 15 m.

The gate circuit 14 samples the intermediate frequency signal of the intermediate frequency amplifying circuit 4 with the gate pulses of the gate pulse generating circuit 13. The frequency of the gate circuit 14 after the sampling detection is designated as $f_B$.

When the first saw tooth wave width $T_1$ of the saw tooth wave generating circuit 7 is 10 [$\mu$ sec.], the repeating period $T_o$ of the first saw tooth wave is 15 [$\mu$ sec.], the frequency dividing ratio of the frequency dividing circuit 10 is 1/N with a sampling number N equal to 4,000 and the detectable distance of the radar is 1.5 [Km]. The frequency $f_B$ after the sampling is given by the following equations (FIGS. 5 and 6).

$$\frac{1}{f_B} = \left(T_o + \frac{T_1}{N}\right) \frac{\frac{1}{f_{if}}}{\frac{T_1}{N}} \quad (4)$$

$$f_B = \frac{f_{if}}{N\frac{T_o}{T_1} + 1} \quad (5)$$

wherein $N\frac{T_o}{T_1} (= 6,000) \gg 1$ $$f_B = \frac{f_{if}}{N\frac{T_o}{T_1}} [Hz] \quad (6)$$

The data inserted in equation (6):

$$f_B = \frac{30 \times 10^6}{4000 \frac{15 \times 10^{-6}}{10 \times 10^{-6}}} = 5 \times 10^3 [Hz].$$

The video signal which is sampled by the gate circuit 14 has a distance resolution of less than 15 m. The band width of 0 – 5 KHz and one picture image is formed for each 60 ($T_o N$) [ms].

In the microwave head 2, it is necessary that the phase of frequency $f_1$ which is triggered with the output signal of the reference pulse generating circuit 1 completely coincide with the phase of frequency $f_o$ of the microwave head 2 for generating the intermediate frequency signal and the reflected wave from the target which has the frequency $f_1$. When the phase coincidence no longer exists, the signal of the gate circuit 14 after sampling becomes meaningless.

Accordingly, in general, it is necessary to have means for synchronizing the frequency for oscillation with respect to the target and the local oscillation frequency for generating the intermediate frequency in the microwave head 2. However, it has been found, by experiment, that in the means for providing the intermediate frequency signal by oscillating two different frequencies by the varactor diodes and one gunn diode, as stated above, it is unnecessary to have means for synchronizing and the coincidence phase relation can be completely maintained between the two frequencies.

When the output signal of the gate circuit 14 is amplified by the low frequency amplifying circuit 15, the high frequency component higher than 5 [KHz] in the video signal amplifying circuit 16 is removed. Accordingly, it is sufficient to have a frequency band width of about 5 [KHz] and the preparation of the radar can be remarkably simplified.

It is also possible to use a cathode-ray tube having a low frequency response as the cathode-ray tube 18 (a cathode-ray tube having high frequency response is not required).

Moreover, as an advantage of the radar of the invention, the pulse noise included in the reflected wave from the target can be removed. Since the receiving waveform of the gate circuit 14 is sampled for N times (4,000 times) to form one receiving waveform so as to display one observed picture image, and since the instantaneous pulse noise usually has a pulse maintaining period $\tau$ of several n sec. up to several $\mu$ sec., only one sampling is made during the period for forming one observed picture image that is about 60 mS. Accordingly, after sampling, the signal has pulses having a pulse width $$(T_o + T_1/N) \approx 15 [\mu \text{ sec.}].$$

In the low frequency amplifying circuit 15, high frequency components of the pulse noise which are most of the energy of the pulse noise are removed whereby there is no problem in the display on the picture plate of the cathode-ray tube 18.

Figure 8:
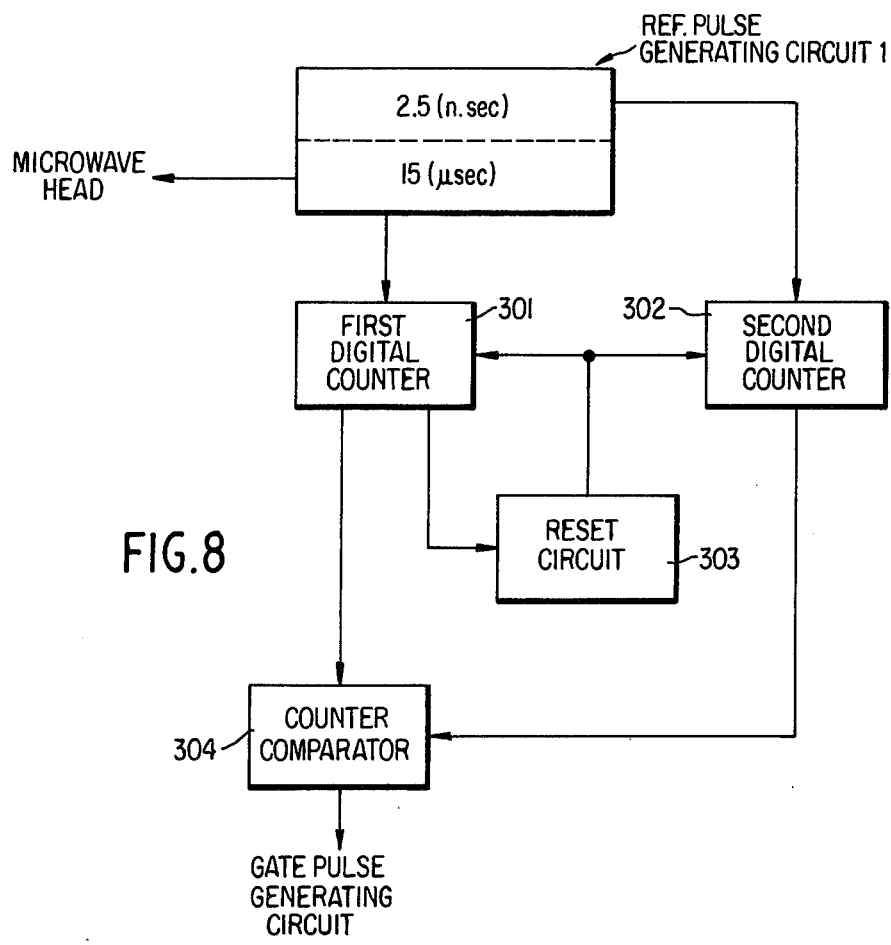
FIG. 8 shows another embodiment of the present invention.

The other embodiment of the pulse generator for generating gate pulses by a digital circuit in the sampling detection of the intermediate frequency signal by the gate pulses in the gate circuit 14 is shown in FIG. 8 and will now be described. The first digital counter 301 counts reference pulses generated from the reference pulse generating circuit at each period $T_o = 15$ [$\mu$ sec.]. The second digital counter 302 counts pulses generated at 2.5 [n sec.] = $T_1/N$ because the periodical interval $T_1$ from the base of the reference pulse is 10 [$\mu$ sec.] and the sampling number is 4,000. The counter comparator 304 generates output pulses when the counted numbers of the first and second digital counters become equal. As stated in the former embodiment, the sampling position of the intermediate frequency signal is determined by sequentially shifting for 2.5 [n sec.] in each one count by the first digital counter for counting the reference pulse.

The reset circuit 303 works when the counted number of the second digital counter reaches the sampling number N of 4,000 whereby the counts of the first and second digital counters become zero. The output pulses of the counter comparator are input to the gate pulse generating circuit to generate gate pulses whereby the intermediate frequency signal of the gate circuit is sampled depending upon the gate pulses.

In the radar of the invention, the microwave is radiated from the microwave head and the reflected wave from the target is received by the microwave head to generate an intermediate frequency signal. The intermediate frequency signal is sampled by using a gate circuit. The signal given by the sampling is displayed as a video signal on a display tube. The video signal amplifying circuit and the display tube can be for low frequency. In the sampling detection, the pulse noise can be removed whereby the observed image is clear and erroneous observation caused by noise can be decreased.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A radar comprising:
an antenna for transmitting and receiving waves;
a transmitting and receiving device for transmitting a signal from the antenna corresponding to reference pulses of a reference pulse generator and receiving with the antenna the reflected signal from a target to generate an intermediate frequency signal;
a gate pulse generator under the control of the reference pulses for generating gate pulses which determine the sampling position of the intermediate frequency signal;
a sampling gate circuit for detecting a video signal by sampling the intermediate frequency signal from the transmitting and receiving device in accordance with the gate pulses;
a display for displaying the video signal;
the gate pulse generator comprising
a first signal generator for determining the sampling position in accordance with the reference pulses;
a frequency divider for frequency-dividing the reference pulses;
a second signal generator for determining the sampling position in accordance with the output of the frequency divider;
a comparator for determining the sampling position by comparing the outputs of the first and second signal generators; and
a gate pulse generating circuit for generating gate pulses in accordance with the output signal of the comparator.

2. A radar comprising:
an antenna for transmitting and receiving waves;
a transmitting and receiving device for transmitting a signal from the antenna corresponding to reference pulses of a reference pulse generator and receiving with the antenna the reflected signal from a target to generate an intermediate frequency signal;
a gate pulse generator under the control of the reference pulses for generating gate pulses which determine the sampling position of the intermediate frequency signal;
a sampling gate circuit for detecting a video signal by sampling the intermediate frequency signal from the transmitting and receiving device in accordance with the gate pulses;
a display for displaying the video signal;
the gate pulse generator comprising
a first saw tooth wave generator for generating saw tooth waves in accordance with the reference pulses;
a frequency divider for frequency-dividing the reference pulses;
a second saw tooth wave generator for generating saw tooth waves in accordance with the output pulses of the frequency-divider;
a voltage comparator for generating an output signal when the saw tooth wave voltages of the first and second saw tooth wave generators are equal; and
a gate pulse generating circuit for generating gate pulses in accordance with the output signal from the voltage comparator.

3. A radar comprising:
an antenna for transmitting and receiving waves;
a transmitting and receiving device for transmitting a signal from the antenna corresponding to reference pulses of a reference pulse generator and receiving with the antenna the reflected signal from a target to generate an intermediate frequency signal;
a gate pulse generator under the control of the reference pulses for generating gate pulses which determine the sampling position of the intermediate frequency signal;
a sampling gate circuit for detecting a video signal by sampling the intermediate frequency signal from the transmitting and receiving device in accordance with the gate pulses;
a display for displaying the video signal;
the gate pulse generator comprising
a first counter for counting the reference pulse number;
a second counter for dividing a part or a whole of the interval between the reference pulse and the next reference pulse into plural pulses and counting the divided pulse number;
a count comparator for generating an output signal when the counted numbers of the first and second counters are equal;
a gate pulse generating circuit for generating gate pulses in accordance with the output signal from the count comparator;
a resetting device for resetting the first and second counters when the counted number of the first counter becomes N.

4. A radar comprising:
an antenna for transmitting and receiving waves;
a transmitting and receiving device for transmitting a signal from the antenna corresponding to reference pulses of a reference pulse generator and receiving with the antenna the reflected signal from a target to generate an intermediate frequency signal, comprising a gunn diode disposed in a cavity resonator, a varactor diode for deflecting the resonance frequency of the cavity resonator in accordance with the reference pulses, a circulator connected to the cavity resonator and a mixer diode for generating an intermediate frequency signal by frequency-mixing the reflected wave from a target with the local oscillation frequency of a part of the oscillating output of the gunn diode;

a first saw tooth wave generator for generating a first saw tooth wave in accordance with the reference pulses;
a frequency divider for frequency-dividing the reference pulses;
a second saw tooth wave generator for generating the second saw tooth wave in accordance with the output of the frequency divider;
a voltage comparator for generating an output signal when the saw tooth wave voltages of the first and second saw tooth wave generators are equal;
a gate pulse generating circuit for generating gate pulses in accordance with the output signal of the voltage comparator;
a sampling gate circuit for sampling the intermediate frequency signal from the transmitting and receiving device in accordance with the gate pulses;
a video signal amplifier for low frequency amplifying the output signal of the sampling gate circuit; and
a cathode-ray tube for displaying the output of the video signal amplifier.

* * * * *